United States Patent
Faisca et al.

(10) Patent No.: US 11,828,140 B2
(45) Date of Patent: Nov. 28, 2023

(54) SYSTEM AND METHODS OF USE FOR A BLIND PLUG

(71) Applicant: FMC Technologies, Inc., Houston, TX (US)

(72) Inventors: Andre Faisca, Houston, TX (US); Leonardo Bernardo, Houston, TX (US); Jorge Bonfim, Houston, TX (US); Renato Bernardo, Houston, TX (US); Guilherme Moura, Houston, TX (US); Huei Lai, Houston, TX (US); Rafael Galvao, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 17/597,931

(22) PCT Filed: Aug. 2, 2019

(86) PCT No.: PCT/US2019/044790
§ 371 (c)(1),
(2) Date: Jan. 28, 2022

(87) PCT Pub. No.: WO2021/025662
PCT Pub. Date: Feb. 11, 2021

(65) Prior Publication Data
US 2022/0268133 A1    Aug. 25, 2022

(51) Int. Cl.
*E21B 41/00* (2006.01)
*E21B 43/017* (2006.01)
*E21B 43/013* (2006.01)

(52) U.S. Cl.
CPC ........ *E21B 43/017* (2013.01); *E21B 41/0007* (2013.01); *E21B 43/013* (2013.01)

(58) Field of Classification Search
CPC ... E21B 41/0007; E21B 43/013; E21B 43/017
See application file for complete search history.

(56) References Cited

U.S. PATENT DOCUMENTS 2,784,790 A * 3/1957 Boer .................... E21B 33/1275
                                                        285/86
6,502,632 B1    1/2003 Pittman
(Continued)

FOREIGN PATENT DOCUMENTS

| EP | 2770217 A2 | 8/2014 |
| GB | 2498075 A  | 7/2013 |

(Continued)

OTHER PUBLICATIONS

International Search Report issued in Application No. PCT/US2019/044790, dated May 15, 2020 (4 pages).

(Continued)

*Primary Examiner* — Matthew R Buck
(74) *Attorney, Agent, or Firm* — Osha Bergman Watanabe & Burton LLP (57) ABSTRACT

A valve block may be provided with a plurality of flow bores within a body the valve block. In addition, valve block may have a plurality of openings opening at an outer surface of the valve block and in fluid communication with the plurality of flow bores. Further, a blind plug may be within at least one of the openings. The blind may include a cap coupled to an inner surface of the at least one opening and a plug having a first end face in contact with the cap and a second end face extending into the flow bore. Furthermore, the blind plug may seal the at least one opening from a surrounding environment.

20 Claims, 7 Drawing Sheets

(56) References Cited

U.S. PATENT DOCUMENTS

| | | | |
|---|---|---|---|
| 8,230,928 B2* | 7/2012 | Cuiper | E21B 33/035 |
| | | | 166/368 |
| 11,396,895 B2* | 7/2022 | Mollan | F16K 27/003 |
| 2019/0093452 A1* | 3/2019 | Martinez | E21B 34/02 |
| 2019/0154033 A1* | 5/2019 | Brooks | F16K 15/026 |

FOREIGN PATENT DOCUMENTS

| | | | | |
|---|---|---|---|---|
| GB | 2503561 A | * | 1/2014 | E21B 41/0007 |
| WO | 0173259 A1 | | 10/2001 | |

OTHER PUBLICATIONS

Written Opinion issued in Application No. PCT/US2019/044790, dated May 15, 2020 (6 pages).

\* cited by examiner

SYSTEM AND METHODS OF USE FOR A BLIND PLUG

BACKGROUND

Flow manifolds, blocks, and trees may be useful in the process of extracting and managing wells that are drilled into the earth to retrieve one or more subterranean natural resources, including oil and gas. Said flow manifolds may be utilized both offshore and onshore. In operations, flow manifolds are particularly useful in directing and managing the flow of fluids (e.g., oil and/or gas) from one or more wells (subsea or land). A flow manifold is a structure having a plurality of flow bores along with a set of pipes and components through which fluid, such as oil and gas, may flow. Further, flow manifolds may include a number of flow control devices, including valves and chokes, and may also include a number of instruments or devices for measuring and obtaining pertinent data about the fluid flowing through the one or more pipes located in the flow manifolds.

When used in a marine environment, a subsea flow manifold may be landed and locked adjacent to a subsea tree or other subsea structures. As part of field architecture and planning, the location of subsea trees around one or more wells involves the planning for flow manifolds that assist in routing the fluids produced from the wells to another subsea structure or to a riser pipeline for further processing. Flow lines are often used to interconnect a flow manifold to another subsea structure as part of a subsea oil and gas field layout for fluid communication. Such flow lines may generally be rigid or flexible hoses or pipes that are provided with subsea mateable connectors at either end. Such flexible hoses or pipes are known in the art as jumpers or spools, and may be used to connect several wells and other subsea equipment together.

Figure 1:
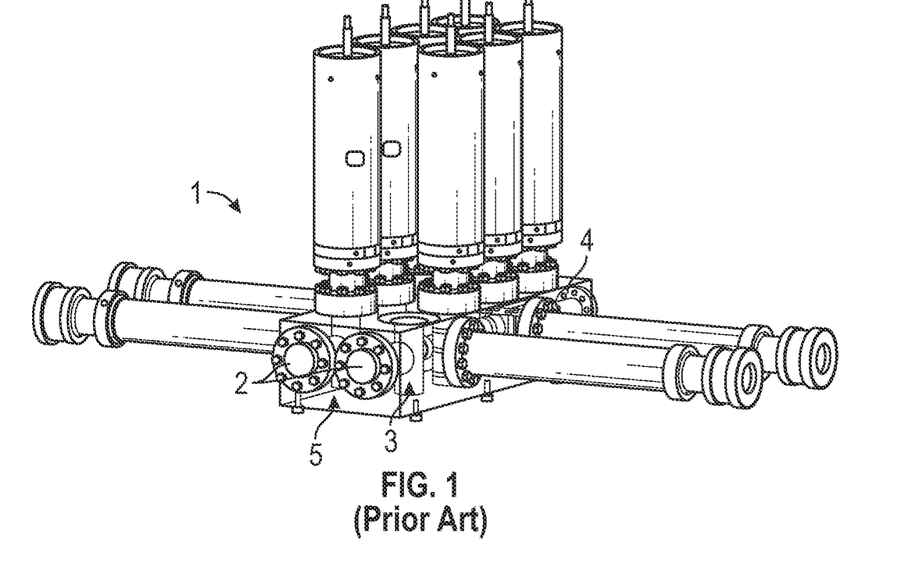
FIG. 1 is a perspective view of a valve block in accordance with the prior art.

Conventional block manifolds in the oil and gas industry are typically very large and heavy. FIG. 1 illustrates an example of a conventional block manifold 1. The conventional block manifold 1 may include an extensive layout and arrangement of pipes that weigh several tons each. In some instances, blind flanges 2 may be used to close bores 3 that do not have connection flanges 4. The blind flanges 2 may include or crush a metal gasket (e.g., API 6BX) to close the bores 3. Additionally, the blind flanges 2 may be preloaded using torqueing studs and nuts around the metal gasket. The blind flanges 2 require a number of studs and nuts to be torqued to an outer surface 5 of the conventional block manifold 1. As shown by FIG. 1, the blind flanges 2 may have a geometry that is a circle and the sealing gasket may be surrounded by studs and nuts. As the geometry of the blind flanges 2 is circular and is bolted to the outer surface 5 of the conventional block manifold 1, the outer diameter of the blind flanges 2 increases an overall size and weight of the conventional block manifold 1. Such conventional block manifold 1 may be both heavier in weight and may also be more expensive to manufacture because of the higher number of parts and components.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein relate to a valve block. The valve block may include a plurality of flow bores within a body the valve block; a plurality of openings at an outer surface of the valve block and in fluid communication with the plurality of flow bores; and a blind plug within at least one of the openings. The blind may include a cap coupled to an inner surface of the at least one opening; and a plug having a first end face in contact with the cap and a second end face extending into the flow bore. Additionally, the blind plug may seal the at least one opening from a surrounding environment.

In another aspect, the embodiments disclosed herein relate to a method for manufacturing a valve block. The method may include machining one or more flow bores in a body of the valve block; providing at least one opening in fluid communication with the one or more flow bores; positioning a blind plug within the at least one opening; coupling a cap of the blind plug to an inner surface of the at least one opening; and sealing the one or more openings with the blind plug from an environment surrounding the body of the valve block by sealingly engaging an outer surface of the blind plug to an inner surface of the flow bore.

In yet another aspect, the embodiments disclosed herein relate to a blind plug. The blind plug may include a cap extending from a first end surface to a second end surface, wherein an outer surface of the cap between the first end surface and the second end surface comprises a connecting surface; and a plug extending from a first end face to a second end face, wherein the first end face of the plug is in contact with the second end surface of the cap.

Other aspects and advantages will be apparent from the following description and the appended claims.

DETAILED DESCRIPTION

Embodiments of the present disclosure are described below in detail with reference to the accompanying figures. In the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description. As used herein, the term "coupled" or "coupled to" or "connected" or "connected to" may indicate establishing either a direct or indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

In one aspect, embodiments disclosed herein relate to plugs within an opening of a valve block. A plug may also be interchangeably referred to as a blind plug in the present disclosure. Additionally, a valve block may also be interchangeably referred to as a flow manifold or flow control module assembly in the present disclosure. Further, embodiments disclosed herein are described with terms designating a valve block or flow manifold reference to a block with one or more flow bores, having at least one inlet and outlet in fluid communication with the flow bores. The block assembly may control and regulate the flow of fluids for purposes of either injecting fluid (e.g., frac fluid) into an injection well or recovering fluid (e.g., hydrocarbons or other reservoir fluid) from a production well. Additionally, at least one opening in a body of the block may be formed by the machining and/or forging of at least one cross-drill flow bore within the body of the block. Further, the at least one cross-drill flow bore may be in fluid communication with the flow bores.

In addition, any terms designating a valve block or flow manifold (e.g., any wellheads or frac valves) at a rig type (e.g., any land rig or offshore rig) should not be deemed to limit the scope of the disclosure. It is to be further understood that the various embodiments described herein may be used in various stages of a well, such as rig site preparation, drilling, completion, abandonment etc., and in other environments, such as work-over rigs, fracing installation, well-testing installation, oil and gas production installation, without departing from the scope of the present disclosure. It is recognized by the different embodiments described herein that a flow manifold or valve block plays a valuable and useful role in the life of a well. Further, it is recognized that the fluid flow configuration and arrangement of components for a valve block according to one or more embodiments described herein may provide a cost effective alternative to conventional valve blocks. The embodiments are described merely as examples of useful applications, which are not limited to any specific details of the embodiments herein.

Conventional valve blocks in the oil and gas industry are typically very large and heavy. Conventional valve blocks may include an extensive layout and arrangement of pipes that weigh several tons each. In some instances, a pipe used to direct fluid into another pipe may be ten inches in diameter and may include complicated bends or changes in orientation. Such valve blocks may be both heavier in weight and may also be more expensive to manufacture because of the higher number of parts and components. For example, conventional valve blocks may be machined or manufactured to have larger bodies in order to have space for blind flanges to be bolted on the bodies. This additional size of the valve block body is needed to account for the blind flanges being bolted on the bodies of the valve block which adds to the weight, size, manufacture costs and time, repair time, and overall cost of valve blocks.

Blind plugs according to embodiments of the present disclosure may have a smaller overall profile without sacrificing its sealing size (i.e., the size of the blind plug's sealing portion that fits within a flow bore), and thus, using blind plugs of the present disclosure to seal openings in a valve block may allow for an increased number of flow bores to be formed within the valve block. As described herein, blind plugs of the present disclosure may include a plug to prevent a fluid flow and a cap to maintain a position of the plug within a fluid pathway. The blind plugs may be removably attached or fixed within components having an opening leading to a flow path for fluids, such as a flow bore, that are arranged in a certain layout and contained within a valve block or flow manifold. The flow bores included in valve blocks may be used to direct fluid produced from or injected into a well. As used herein, fluids may refer to slurries, liquids, gases, and/or mixtures thereof. In some embodiments, solids may be present in the fluids. By sealing the openings with the bling plugs, the valve block may have a significant reduction in the complexity, design, number of components, size, and weight of the valve block.

Accordingly, one or more embodiments of the present disclosure may be used to overcome challenges of conventional valve blocks as well as provide additional advantages over conventional valve blocks. In one or more embodiments, valve blocks with one or more blind plugs may be lighter in weight and lower in cost as compared with conventional valve blocks due, in part, to including a blind plug of the present disclosure within an opening of the valve block in fluid communication with one or more flow bores of the valve block to seal the opening, rather than increasing the size and complexity of the flow manifold. As discussed herein, fixing or removably attaching a blind plug within one or more of the openings in the body of the valve block may create a compact valve block with less components as the blind plug is within the openings (rather than using additional space around the openings for attaching the seal to the block). Additionally, the blind plug may comprise components that are forged, machined, printed, and/or produced through additive manufacturing, and thus may be easily installed within the openings, relaxing control tolerances and improving manufacture (e.g., reduced cost and reduced time to manufacture). Furthermore, by having the blind plug within one or more openings of the body, the valve block may be manufactured to minimize or eliminate the need for large bodies and/or needing an outer surface manufactured to receive blind flanges. Overall the blind plug may minimize product engineering, reduction of assembly time and number of parts, hardware cost reduction, and weight and envelope reduction.

Figure 2:
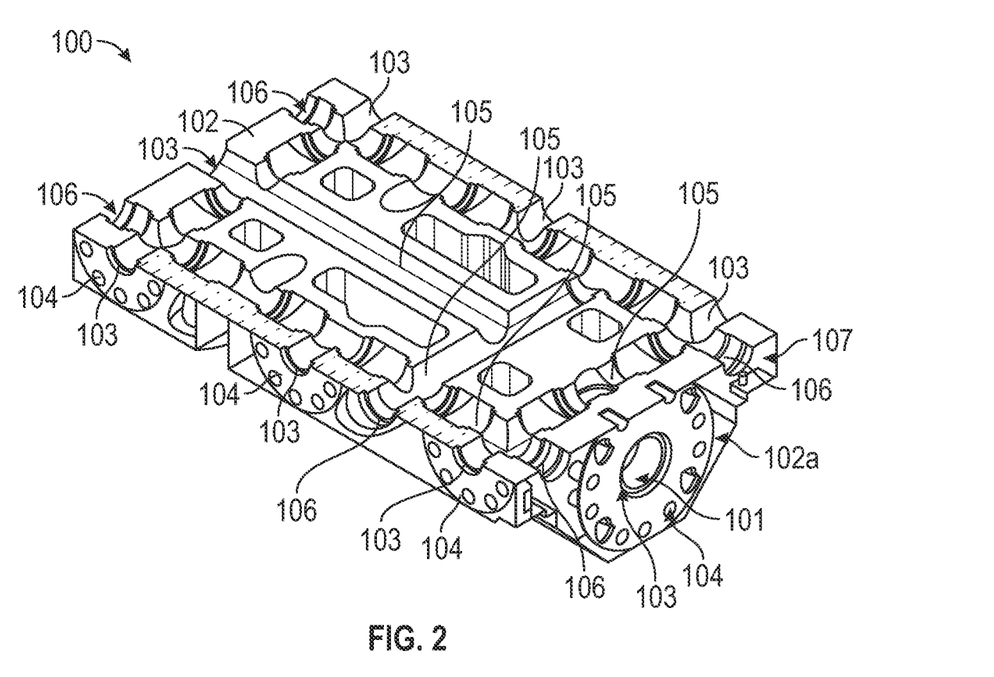
FIG. 2 is a perspective cross-sectional view of a valve block in accordance with one or more embodiments of the present disclosure.

Turning to FIG. 2, FIG. 2 shows a cross-sectional view of a valve block 100 in accordance with one or more embodiments of the present disclosure. In one or more embodiments, the valve block 100 may be coupled to well equipment, such as a well head (not shown). As known in the art, a well head may be a structure useful for producing fluid or injecting fluid into a well, and is often a complex configuration of actuated valves and other components having various functions relevant to the well. In some embodiments, the valve block 100 may be coupled to frac equipment. In addition, the valve block 100 may be arranged in series to distribute and manage fluid flow over a wider area in some instances and to connect to multiple pieces of equipment. In one or more embodiments, the valve block 100 may be used to direct fluid flowing from in or out of the well to another structure or distribution point for storage and/or processing.

In one or more embodiments, the valve block 100 may have a fluid conduit, such as one or more flow bores (101). In a non-limiting example, a primary flow bore 101 may be positioned through a lower portion 102a of a body 102 of the valve block 100. Additionally, the valve block may include more than one inlet and outlet 103, such as two, three, or more inlets or outlets 103, in fluid communication with the primary flow bore 101. It is further envisioned that the body 102 of the valve block 100 may be provided with a connection surface 104 around the one or more inlets and outlets 103. The connection surface 104 may be used to bolt a connection flange or a flow line (not shown) to the body 102 of the valve block 100 such that fluid may enter or exit the valve block 100 through the one or more inlets and outlets 103. For example, a connection surface 104 may include predrilled pilot holes spaced around the inlets/outlets 103, which may receive the bolts for attaching connection flanges. Other connection surfaces may include other types of connection features to connect components to the inlets/outlets. A connection surface 104 may extend completely around the perimeter of an inlet/outlet and a radial distance away from the inlet/outlet along the outer surface of the valve block body 102. The radial distance of the connection surface 104 expands the overall space on a valve block 100 taken up by each inlet/outlet having such connection surface 104.

According to embodiments of the present disclosure, a valve block 100 may further include one or more openings 106 that do not have a connection surface 104 around its perimeter. Openings in a valve block may include inlets and/or outlets and may or may not have a connection surface therearound, depending on if the opening is designed to receive a conventionally attached component (e.g., with a flange connected around a connection surface) or if the opening is designed to receive a blind plug according to embodiments of the present disclosure, which would not need a connection surface. Thus, for easier reference between openings with and without connection surfaces, the terms "inlet" and/or "outlet" may be used herein to refer to openings in a valve block that have a connection surface around its perimeter (a radial distance around the perimeter of an opening that is provided along the outer surface of the valve block to allow attachment of other components to the openings, and may include multiple connection features such as pilot holes); and the term "opening" may be used herein to refer to openings in a valve block that do not have a connection surface around its perimeter.

Further, the valve block 100 may have one or more valves (not shown) to direct the flow traveling through the one or more flow bores 101 and one or more cross-drill flow bores 105. In one or more embodiments, the cross-drill flow bores 105 may be used to provide a fluid conduit that fluidly connects the internal components of the valve block 100. Further, some of the cross-drill flow bores 105 may end at the one or more inlets and outlets 103 while some of the cross-drill flow bores 105 may end at one or more openings 106 in the body 102 of the valve body 100 that may not be used as inlets and outlets (103). Additionally, a surface of the body 102 around the one or more openings 106 may not have a connection surface such as the connection surface 104 around the one or more inlets and outlets 103. The one or more openings 106 may be formed in an outer surface 107 of the body 102 when the cross-drill flow bores 105 are drilled or machined within the body 102. One skilled in the art will appreciate how the valve block 100 may have any number of flow bores 101, cross-drill flow bores 105, inlets and outlets 103, and openings 106 without departing from the scope of the disclosure. Furthermore, one skilled in the art will appreciate how the flow bores 101, cross-drill flow bores 105, the inlets and outlets 103, and the openings 106 of valve block 100 may be cladded with a corrosion resistant alloy ("CRA"). As will be described herein, a blind plug may be provided in any of the one or more openings 106 of the valve block 100.

In some embodiments, one or more valves may be disposed in or integrated with one or more of the flow bores to direct the fluids within the valve block. Further, one or more flow meters may be integrated with one or more of the flow bores of a flow control module. Furthermore, one or more chokes may be coupled to one of the flow bores of the valve blocks. As known in the art, a choke may be an apparatus used to control pressure of fluid flowing through the choke and also may control a back pressure in the upstream fluid. Other instruments and devices, including without limitation, sensors and various valves may be incorporated within a valve block according to embodiments of the present disclosure.

Figure 3:
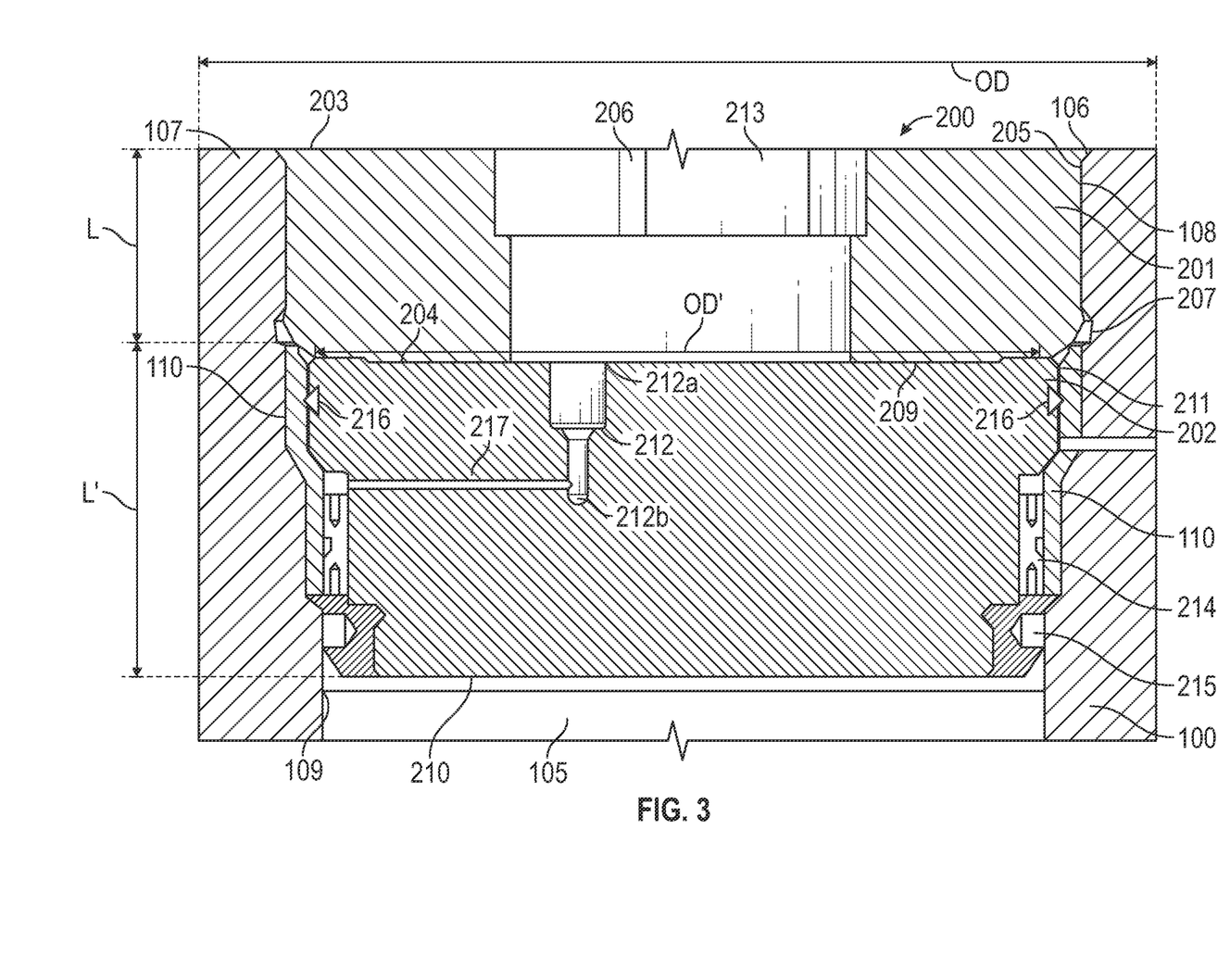
FIG. 3 is a cross-sectional view of a blind plug in a valve block in accordance with one or more embodiments of the present disclosure.

As seen by a cross-sectional view in FIG. 3, in one or more embodiments, a blind plug 200 may be positioned within the openings 106 of valve block 100. The blind plug 200 may include a cap 201 and a plug 202. In a non-limiting example, the cap 201 extends a length L from a first end surface 203 to a second end surface 204. Additionally, the cap 201 may have an outer diameter OD that is equal to or less than an inner diameter of the openings 106. For example, the cap 201 may correspond in size and shape with a portion of an inner surface 108 of the openings 106, such that the cap 201 fits within a portion of the openings 106 in a secured manner (including manufacturing tolerances).

It is further envisioned that an outer surface 205 of the cap 201 may have a connecting surface to engage a connecting surface on the inner surface 108 of the openings 106. In a non-limiting example, the connecting surface of the cap 201 may have threads that may engage threads of the connecting surface of the openings 106 to lock the blind plug 200 within the openings 106. One skilled in the art will appreciate how the threads on the connecting surfaces may be any type of threads, such as ACME threads, API threads, or specialty threads. Further, the connecting surfaces may be provided with a stress relief feature. Other connection types may be provided on connecting surfaces, such as locking segments, split rings, or other type of locking device.

In some embodiments, the first end surface 203 may have at least one torque connection 206, e.g., a hole or protrusion, which may be used to apply torque on the cap 201. For example, a hammer or a wrench may be used to apply a force on the at least one torque connection 206 to rotate and torque the cap 201 to have the first end surface 203 flush with the outer surface 107 of the body 102 of the valve block 100. In other embodiments, a cap may protrude from or be inset from a body outer surface. Additionally, the second end surface 204 of the cap 201 may have beveled edges 207 such that an outer diameter OD' at the second end surface 204 is less than the outer diameter OD at the first end surface 203.

In some embodiments, a first end face 209 of the plug 202 may be attached to the second end surface 204 of the cap 201. In a non-limiting example, the plug 202 may be removably attached or fixed to the cap 201 by using a welding process, an adhesive, a mechanical coupler, a magnet, a molding and other known methods or combination thereof. It is further envisioned that the plug 202 may not be attached to the cap 201. In a non-limiting example, a hydraulic pressure from a fluid may act as a force on a second end face 210 of the plug 202 to press a first end face 209 of the plug 202 against the cap 201. With the cap 201 coupled within the openings 106, the cap 201 counter acts the force from the fluid on the plug 202 such that a position of the plug 202 is maintained. The plug 202 may extend into the cross-drill flow bores 105 from the cap 201 a length L' from the first end face 209 to the second end face 210. In some embodiments, the length L' of the plug 202 may be longer than or equal to the length L of the cap 201. It is further envisioned that the second end face 210 may be a wear surface for fluids to flow across.

Additionally, an outer surface 211 of the plug 202 may be molded, machined, and/or forged to match a shape of an inner surface 109 of the cross-drill flow bores 105. For example, the plug 202 may correspond in size and shape with a portion of the inner surface 109 of the cross-drill flow bores 105, such that the plug 202 fits within a portion of the cross-drill flow bores 105 in a secured manner (including manufacturing tolerances). Further, a portion 110 of the inner surface 109 of the cross-drill flow bores 105 may be cladded with a corrosion resistant alloy.

It is further envisioned that a size of the plug 202 may progressively get smaller from the first end face 209 to the second end face 210. A step down in plug radius may be provided to account for components between the plug and the inner surface of the flow bore in which the plug is disposed. For example, a primary seal 214 may be disposed between the plug 202 and the inner surface 109 of the flow bore 105. The primary seal 214 may extend completely around the circumference of the plug 202 and the inner surface 109.

Still referring to FIG. 3, in some embodiments, the plug 202 may include internal components such as a pressure energizer 212. The pressure energizer 212 may have a first end 212a adjacent to the first end face 209 of the plug 202. When the plug 202 is assembled to the cap 201, the pressure energizer 212 may be accessed through a bore 213 of the cap 201 (where the bore 213 extends from the first end surface 203 to the second end surface 204 of the cap 201). Additionally, the plug 202 may include a conduit 217 that connects a second end 212b of the pressure energizer 212 to a primary seal 214. The primary seal 214 may extend around an outer circumference of the plug 202 and may be a metal-to-metal seal or an elastomer seal. In some embodiments, an O-ring may be additionally used in conjunction with the primary seal 214 or replace the primary seal 214. One skilled in the art will appreciate how the pressure energizer 212 may allow the blind plug 200 to be pressure energized to pressurize the plug 202 and the primary seal 214 against the inner surface 109 of the cross-drill flow bores 105.

Further, the pressure energizer 212 may also be used to pressure test the blind plug 200 to ensure that the openings 106 are sealed off such that fluids may not exit or enter the valve block 100 through the openings 106. In a non-limiting example, the pressure energizer 212 (e.g., a small bore inside the plug 202) allows for pressure to be applied in the small region radially between the plug 202 and the opening 106 and axially between a top part of the primary seal 214 and a secondary seal 216. The pressurization of the pressure energizer 212 may also be referred to as a backside pressure test herein after. The backside pressure test may allow for the primary seal 214 to be tested against an external pressure (e.g., simulating a sub sea water pressure) without having to externally pressure the whole equipment (i.e., the valve block 100). It is further envisioned that the first end 212a of the pressure energizer 212 may be any standard connection groove (e.g., JIC 4) for pressure couplers while the second end 212b of the pressure energizer 212 and the conduit 217 may be passages for communication with regions that are pressurized.

In some embodiments, the plug 202 may be provided with a threaded cylinder 215 to position the primary seal 214 and hold the primary seal 214 in place. Additionally, the primary seal 214 may be positioned and held in place without the threaded cylinder 215. Further, the threaded cylinder 215 may have "chamber like" regions, such as holes, to which bars may be connected during an assembly of the threaded cylinder 215 such that torque may be applied to position the threaded cylinder 215. It is further envisioned that the secondary seal 216 may be placed near an area of the beveled edges 207 of the cap 201 to seal an area between the plug 202 and the cap 201 from a possible leak pathway. One skilled in the art will appreciate how the secondary seal 216 may be used as a second barrier anytime, or alternatively, only when a backside pressure test bore (i.e., pressure energizer 212) is sealed.

In accordance with one or more embodiments, the plug 202 and/or the cap 201 may be a generally cylindrical body forged, machined, printed, and/or produced through additive manufacturing from a material selected from metal materials, plastic materials, carbon fiber materials, composite materials or structural insulating materials. Additionally, the plug 202 and/or the cap 201 is not limited to being in a shape of a cylinder and may have a non-circular cross sectional shape, such as a polygon shape, without departing from the scope of the present disclosure. In a non-limiting example, the plug 202 and/or the cap 201 may be the same material as the valve block. Additionally, the plug 202 and/or the cap 201 may be coated in an anti-corrosion material. In some embodiments, the plug 202 and the cap 201 may be machined or forged as one integrated piece or may be removably attached to each other. It is further envisioned that the plug 202 and/or the cap 201 may be coated with an erosion resistant material such as tungsten carbide or other materials in order to withstand heavy duty erosional conditions.

Figure 4A:
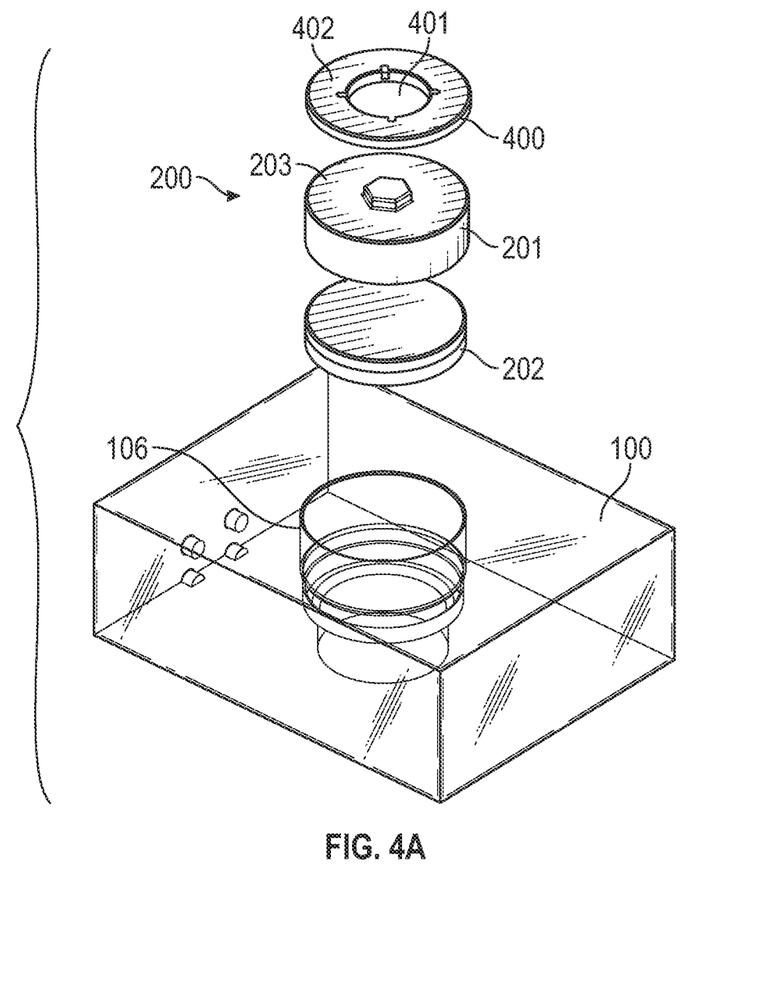
FIGS. 4a-4c show the assembly of a blind plug with a nut in a valve block in accordance with one or more embodiments of the present disclosure.
Figure 4B:
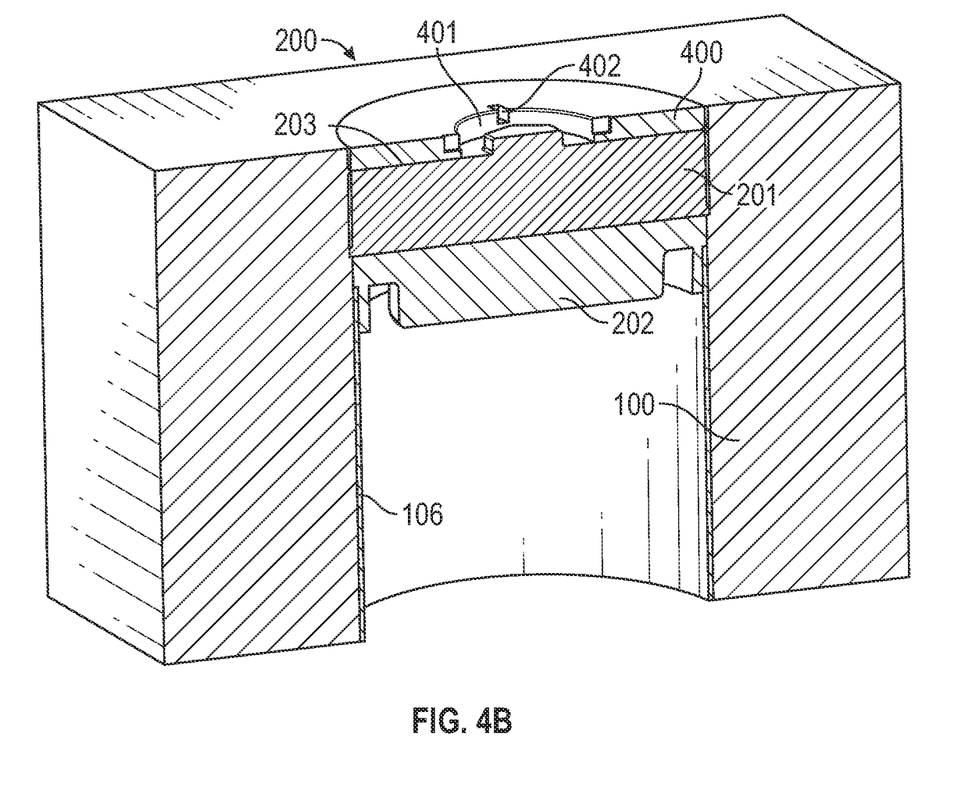
Figure 4C:
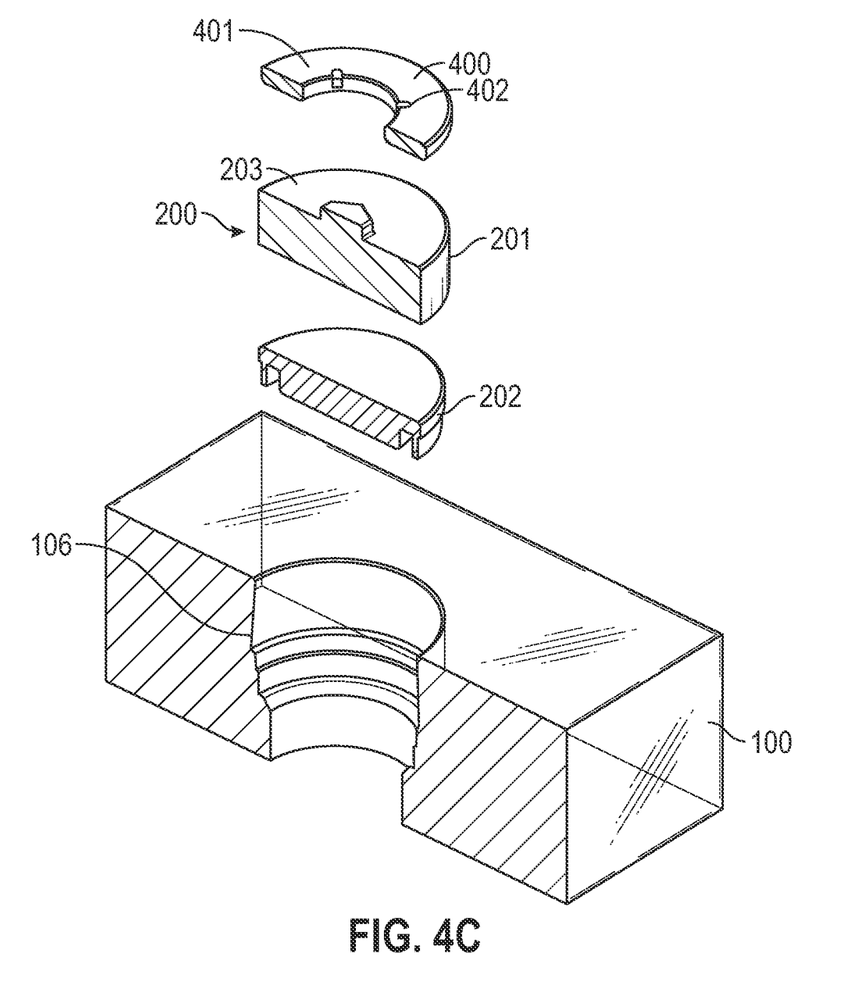

Referring now to FIGS. 4a-4c, another embodiment of a blind plug according to embodiments herein is illustrated, where like numerals represent like parts. The embodiment of FIGS. 4a-4c is similar to that of the embodiment of FIG. 3. However, the blind plug 200 in FIGS. 4a-4c may have a counter nut 400 on the first end surface 203 of the cap 201. The counter nut 400 may have a shape of a ring such that an opening 401 of the counter nut 400 allows access to the at least one torque connection 206 of the cap 201. Additionally, the counter nut 400 may have one or more grooves 402 adjacent to the opening 401 to apply further torque to the counter nut 400 and the cap 201.

Figure 5:
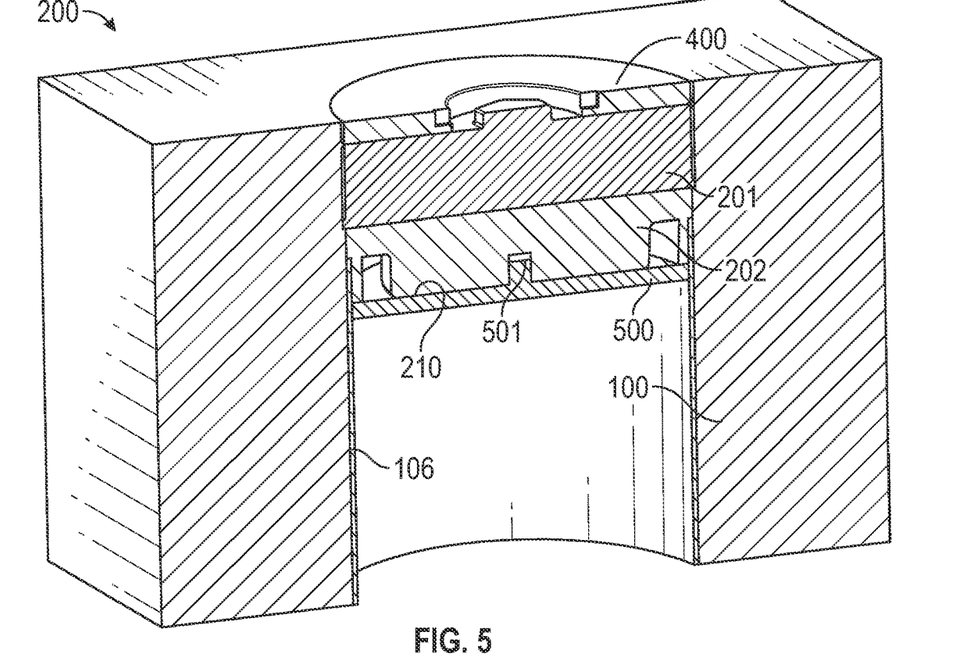
FIG. 5 is a cross-sectional view of a blind plug with a nut and an anti-erosion cap in a valve block in accordance with one or more embodiments of the present disclosure.

Referring now to FIG. 5, another embodiment of a blind plug according to embodiments herein is illustrated, where like numerals represent like parts. The embodiment of FIG. 5 is similar to that of the embodiment of FIGS. 4a-4c. However, the blind plug 200 in FIG. 5 may have an anti-erosion cap 500 on the second end face 210 the plug 202. Additionally, the anti-erosion cap 500 may have a protrusion 501 to connectively engage the anti-erosion cap 500 to the plug 202. The anti-erosion cap 500 may have the same cross-sectional shape as and fit within the opening 106, such that the anti-erosion cap 500 covers the plug 202 and acts as a barrier between the plug 202 and the internal environment in the opening 106. The anti-erosion cap 500 may be made of an erosion resistant material having more erosion resistance to the internal environment in the opening 106 than the material forming the plug 202.

Figure 6:
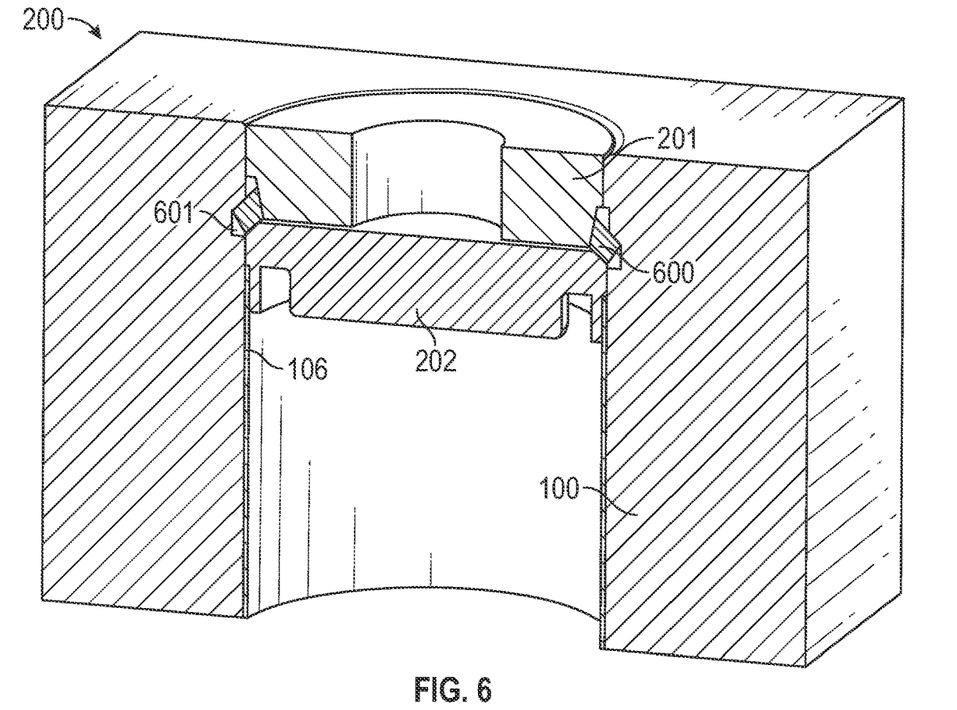
FIG. 6 is a cross-sectional view of a blind plug with a split ring in a valve block in accordance with one or more embodiments of the present disclosure.

Referring now to FIG. 6, another embodiment of a blind plug according to embodiments herein is illustrated, where like numerals represent like parts. The embodiment of FIG.

6 is similar to that of the embodiment of FIG. 3. However, the blind plug 200 in FIG. 6 may include a split ring 600 between the cap 201 and the plug 202. It is further envisioned that the cap 201 may be preloaded to lock the split ring 600 in a groove 601 of the valve block 100.

Figure 7:
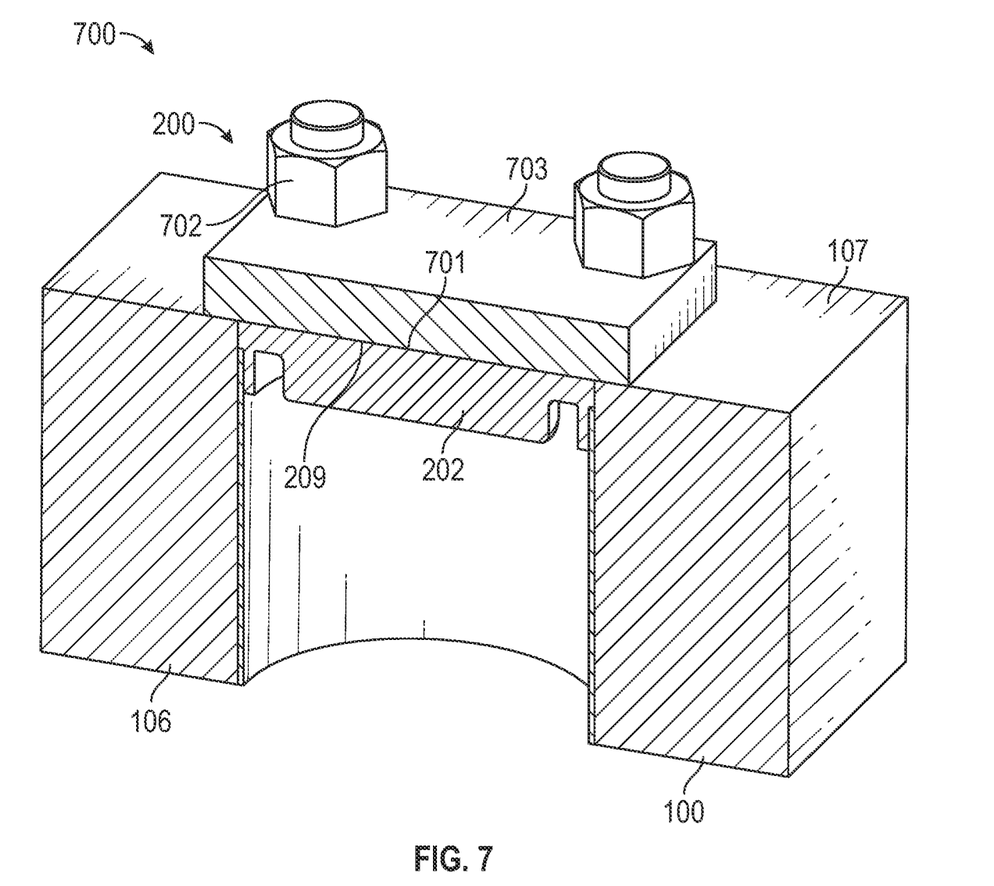
FIG. 7 is a cross-sectional view of a blind plug with an external flange in a valve block in accordance with one or more embodiments of the present disclosure.

Referring now to FIG. 7, another embodiment of a blind plug according to embodiments herein is illustrated, where like numerals represent like parts. In the embodiment shown, instead of using a cap (201), the blind plug 200 may be held within the opening 106 by an external flange 700. In a non-limiting example, the external flange 700 may have a rear surface 701 abutting the first end face 209 of the plug 202 and the outer surface 107 of the valve block 100. Additionally, one or more bolts 703 may bolt the external flange 700 to the outer surface 107 of the valve block 100 by extending through a front surface 702 of the external flange 700 and past the rear surface 701. The external flange 700 may act as a type of cap to hold the plug 202 within the valve block 100, except rather than extending at least partially into the valve block body (such as cap 201 shown in FIG. 3), the external flange 700 may be entirely located on an outside of the valve block body.

Furthermore, methods of the present disclosure may include manufacturing and use of the bling plug (200), valve block, and other structures, such as in FIGS. 2-7 for sealing an opening from a leak pathway. Because the method may apply to any of the embodiments, reference numbers are not referenced to avoid confusion of the numbering between the different embodiments.

In one or more embodiments, a valve block may be machined or forged from one solid piece of material. Those skilled in the art would appreciate how the material can be any material suitable for well site conditions, for example, metals, ceramics, and/or composites. Additionally, coatings may be added to the valve block for thermal insulation and to prevent corrosion. The valve block may be forged and/or machined into the size and shape needed based on a required application. Further, the valve block may be forged and/or machined to integrate one or more flow bores in a body of the valve block, where manufacturing processes well known in the art may be used to ensure proper dimensions and cleanliness of the bores are achieved. In a non-limiting example, the body of the valve block may be forged and/or machined without any flow bores, and then the body may be drilled to have one or more flow bores. Further, the valve block may be provided with one or more inlets and outlets in fluid communication with the one or more flow bores. A surface on the body of the valve body around the one or more inlets and outlets may be a connection surface for flow lines. In some embodiments, one or more cross-drill flow bores may be drilled within a body of the valve body and may be in fluid communication with the one or more flow bores. Further, by drilling the one or more cross-drill flow bores, one or more openings may be formed in the body of the valve block.

Additionally, a blind plug may be machined, forged, printed, and/or produced through additive manufacturing from one solid piece of material or multiple components. In a non-limiting example, the blind plug may be manufactured to have a cap and a plug. Additionally, a first end face of the plug may be removably attached or fixed to an end of the cap. A second end face of the plug may be provided with a wear surface. Further, the cap and plug may be machined and forged to correspond in size and shape with an inner surface of the one or more openings and the one or more cross-drill flow bores, respectively (including manufacturing tolerances). In some embodiments, an end of the cap opposite the plug may be provided with at least one torque connection (e.g., by drilling or otherwise forming one or more groove(s) or dimple(s) into the surface of the cap). Further, an outer surface of the cap may be provided with a connection surface, such as threads formed around the outer side surface of the cap, e.g., by machining threads around the outer side surface. Furthermore, the plug may be provided with a pressure energizer to pressurize a seal in contact with the plug.

With the flow bores and the cross-drill flow bores formed, the blind plug may be positioned within the one or more openings. The bling plug may be held in the one or more openings by having the connection surface of the cap coupled to a connection surface of an inner surface of the one or more openings. One skilled in the art will appreciate how the blind plug may be held in place with an externally bolted plate bolted to an outer surface of the valve block without departing from the scope of the present disclosure. It is further envisioned that the externally bolted plate may not have to circumferentially compress a seal, and thus, be much smaller than conventional flanges. In some embodiments, the connections surface may have threads such the at least one torque connection of the cap may be torqued to thread the cap within the one or more openings. Additionally, with the cap in the one or more openings, an end surface of the cap may be flush with an outer surface of the body of valve block. In some embodiments, the cap may be held in a groove of the one or more openings, such as by welding the cap to the groove. With the cap secured in the one or more openings, the plug may extend into the cross-drill flow bores. An outer surface of the plug may sealingly engage against an inner surface of the cross-drill flow bores. In some embodiments, a seal may be provided between the plug and the inner surface of the cross-drill flow bores. By having the plug seal against the cross-drill flow bores, the one or more openings may be sealed from an environment surrounding the body of the valve block. In particular, the blind plug may prevent fluids and/or debris from exiting and entering the valve block through the one or more openings.

Further, one skilled in the art will appreciate how the flow bores, the cross-drill flow bore, the openings and the blind plug may be cladded with a corrosion resistant alloy (CRA) before the installation of the blind plug in the valve block. Corrosion resistant alloys may be formed of, for example, martensitic and martensitic/ferritic stainless steel, duplex stainless steel, austenitic-nickel-base alloys, and others, depending on, for example, the environment in which the CRA is to be used. According to embodiments of the present disclosure, a block of metal or alloy used to form a manifold may be heat treated. After heat treatment, the block may be pre-machined to form one or more flow bores through the block. Portions of the pre-machined block (e.g., the inner surfaces of the flow bores) may then optionally be cladded, for example, with a material for added erosion resistance. A blind plug according to embodiments of the present disclosure may be coupled or welded within one or more of the openings after the cladding. Thus, according to embodiments of the present disclosure, the blind plug may be pre-made prior to attaching within an opening. A second machining step may be performed after cladding to assure critical dimensions are maintained.

Once the valve block and the blind plug are manufactured, the valve block may be ready to use. In some embodiments, the blind plug is installed within the valve block before arriving at a work site, such as a rig site. It is further envisioned that blind plug may be installed within the valve block at the work site. In a non-limiting example, a blind plug, according to embodiments of the present disclosure, may be inserted within one or more openings in a body of the valve block.

Additionally, a cap of the blind plug may be coupled to an inner surface of the one or more openings. In order to couple the cap to the one or more openings, torque may be applied to at least one torque connection of the cap to thread together a threaded surface provided on a cap of the blind plug to a threaded portion of the inner surface of the one or more openings.

The one or more openings may be sealed from a surrounding environment with a plug of the blind plug. For example, the blind plug may have an integral seal that is pressurized to seal an outer surface of the plug against an inner surface of the cross-drill flow bore. Furthermore, a radial seal between the plug and the cross-drill flow bore may be pressure energized to ensure a full seal has occurred.

Next, with the valve block at the rig site, the valve block me be fluidly connected to a well. Further, a fluid, such as an injection or production fluid, may enter the valve block through an inlet and travel into one or more flow bores of the valve block. The fluid may then be directed through the one or more flow bores and/or one or more cross-drill flow bore of the valve block. With the fluid flowing in the valve block, the fluid may travel across a face of the plug in the one or more openings. Therefore, the blind plug may prevent the fluid from exiting through the one or more openings such that the fluid may exit out of the valve block through an outlet of the valve block. Additionally, the blind plug may prevent fluids or debris from entering the valve block during operations.

In addition to the benefits described above, with the blind plug reducing a size of the outer surface of the valve block, more flow bores and cross-drill flow bore may be manufactured within the valve block as the blind plug may seal unused openings in the valve block without encroaching onto areas of the block body outer surface surrounding the openings. Additionally, with more bores, the valve block may have more sensitive components installed therein. Further, the blind plug may beneficially enable a compact and lighter weight valve block that may reduce overall cost and complexity of the design. A lighter more compact valve block may increase the range of valve block types capable of being installed to corresponding well equipment, thereby reducing the reliance on a limited number of multi service valve blocks. It is noted that the blind plug may be used for onshore and offshore oil and gas operations.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A valve block, comprising:
   a plurality of flow bores within a body of the valve block;
   a plurality of openings opening at an outer surface of the valve block and in fluid communication with the plurality of flow bores;
   a blind plug within at least one of the openings, the blind plug comprising:
      a cap coupled to the valve block; and
      a plug extending from the cap into the flow bore,
   wherein the blind plug seals the at least one opening from a surrounding environment;
   a first seal disposed between an outer surface of the plug and an inner surface of the flow bore; and
   an area between the blind plug and the flow bore sealed between the first seal and a second seal disposed around the blind plug.

2. The valve block of claim 1, wherein a pressure energizer is disposed within the plug and in communication with the first seal.

3. The valve block of claim 2, wherein the pressure energizer is in fluid communication with the area between the first seal and the second seal.

4. The valve block of claim 1, wherein the plug comprises a threaded cylinder to position and hold the first seal.

5. The valve block of claim 1, wherein the cap comprises a bore extending through the thickness of the cap.

6. The valve block of claim 1, wherein the second end face comprises a wear resistant material.

7. The valve block of claim 1, further comprising an anti-erosion cap disposed at an end face of the plug.

8. The valve block of claim 1, wherein the cap comprises a threaded surface to thread with a threaded portion of the inner surface of the at least one opening.

9. The valve block of claim 1, wherein the cap is bolted to the outer surface of the valve block.

10. The valve block of claim 1, wherein the cap and the plug are integrally formed.

11. A method for manufacturing a valve block, comprising:
    machining one or more flow bores in a body of the valve block;
    providing at least one opening in fluid communication with the one or more flow bores;
    positioning a blind plug within the at least one opening;
    coupling a cap of the blind plug to the valve block;
    sealing the at least one openings with the blind plug from an environment surrounding the body of the valve block by sealingly engaging an outer surface of the blind plug to an inner surface of the flow bore;
    applying pressure through a pressure energizer in the blind plug to a first seal disposed between the blind plug and the inner surface of the flow bore; and
    sealing an area between the first seal and the cap with a second seal.

12. The method of claim 11, wherein the coupling comprises engaging a threaded surface provided on the cap of the blind plug to a threaded portion of the inner surface of the at least one opening.

13. The method of claim 11, wherein the coupling comprises bolting the cap of the blind plug to an outer surface of the valve block.

14. The method of claim 11, further comprising cladding the one or more flow bores and/or the at least one opening.

15. The method of claim 11, further comprising coating the blind plug with erosion resistant materials.

16. The method of claim 11, further comprising using the applied pressure to pressure test the sealing of the area between the first seal and the second seal.

17. A blind plug, comprising:
    a cap having a first end surface and a second end surface opposite the first end surface, wherein an outer surface of the cap comprises a connecting surface;
    a plug having a first end face and a second end face opposite the first end face, wherein the first end face of the plug is in contact with the second end surface of the cap;
    a first seal disposed around an outer surface of the plug between the first end face and the second end face; and a second seal disposed adjacent a beveled edge of the cap to seal an area between the plug and the cap.

18. The blind plug of claim 17, wherein the plug is removably attached to the cap.

19. The blind plug of claim 17, wherein the plug comprises a pressure energizer in communication with the first seal.

20. The blind plug of claim 17, further comprising at least one anti-erosion cap in contact with the second end face of the plug.

\* \* \* \* \*